United States Patent
Khokhani et al.

(10) Patent No.: US 8,911,865 B2
(45) Date of Patent: Dec. 16, 2014

(54) GENERATION KAOLIN BASED PAINT PIGMENT EXTENDER

(75) Inventors: Ashok Khokhani, Manalapan, NJ (US); Kenneth W. Folmar, Macon, GA (US)

(73) Assignee: BASF Corporation, Florham Park, NJ (US)

( * ) Notice: Subject to any disclaimer, the term of this patent is extended or adjusted under 35 U.S.C. 154(b) by 183 days.

(21) Appl. No.: 13/570,322

(22) Filed: Aug. 9, 2012

(65) Prior Publication Data

US 2013/0045384 A1 Feb. 21, 2013

Related U.S. Application Data

(60) Provisional application No. 61/523,546, filed on Aug. 15, 2011.

(51) Int. Cl.
*B32B 5/16* (2006.01)

(52) U.S. Cl.
USPC ........... 428/402; 428/404; 106/484; 106/486; 501/145

(58) Field of Classification Search
USPC ........... 428/402, 404; 106/484, 486; 501/145
See application file for complete search history.

(56) References Cited

U.S. PATENT DOCUMENTS

| | | |
|---|---|---|
| 2,307,239 A | 1/1943 | Rowland et al. |
| 3,586,523 A | 6/1971 | Fanselow et al. |
| 4,578,118 A | 3/1986 | Huege et al. |
| 4,818,373 A | 4/1989 | Bartholic et al. |
| 4,950,628 A | 8/1990 | Landon et al. |
| 6,103,005 A | 8/2000 | Sare et al. |
| 6,136,086 A | 10/2000 | Hen et al. |
| 6,346,145 B1 | 2/2002 | Hen et al. |
| 6,652,642 B2 | 11/2003 | Sare et al. |
| 7,582,157 B2 | 9/2009 | Remortel et al. |
| 7,758,688 B2 | 7/2010 | Sare et al. |
| 2004/0116274 A1 | 6/2004 | Sare et al. |
| 2011/0132808 A1 | 6/2011 | Fu et al. |

FOREIGN PATENT DOCUMENTS

| | | |
|---|---|---|
| WO | 9308133 A1 | 4/1993 |
| WO | 2006014303 A1 | 2/2006 |
| WO | WO2006/014303 | * 2/2006 |

OTHER PUBLICATIONS

International Search Report dated Feb. 20, 2013, issued in corresponding International Patent Application No. PCT/US2012/050168, 3 pgs.

* cited by examiner

*Primary Examiner* — Leszek Kiliman

(74) *Attorney, Agent, or Firm* — Meunier Carlin & Curfman, LLC

(57) ABSTRACT

A fully calcined kaolin pigment extender is provided which has a product Mullite Index (M.I.) of 25.0 or higher. The calcined kaolin pigment extender can be advantageously used in paints to improve scrub and burnish resistance.

20 Claims, No Drawings

GENERATION KAOLIN BASED PAINT PIGMENT EXTENDER

CROSS REFERENCE TO RELATED APPLICATIONS

This application claims priority to U.S. Provisional Application No. 61/523,546, filed Aug. 15, 2011.

FIELD OF THE INVENTION

The present invention relates to calcined kaolin products, their production, and use. More specifically, the invention relates to calcined kaolin pigment extender products that exhibit a unique combination of physical and applied properties not previously seen together in calcined kaolin based pigment extenders. These products, according to the invention, offer improved scrub and burnish resistance while maintaining or improving opacity in paints and other coating compositions. More generally, the inventive products significantly extend the range of use of calcined kaolin in paints and other coating compositions.

BACKGROUND OF THE INVENTION

Paints are typically formulated with a combination of pigments and extenders to achieve desired, hiding power, tint strength, gloss and sheen, color, scrub resistance, burnish resistance, and stain resistance. The selected extenders can, in some cases, economically extend the functionality of the pigments in the formulation. The pigments used in paint can include inorganic and organic pigments, pigment flakes, insoluble dyes and other durable coloring matter. While the pigmentation of the paint can be solely from prime pigments, this is economically impractical given the indicated high pigment volume concentration. Titanium dioxide is widely used in paints and coatings to improve brightness and opacity, but it is an expensive prime pigment. In recent years, considerable efforts have been made to develop satisfactory replacements for titanium dioxide. Common pigment extenders include calcium carbonate, barytes, magnesium silicates, aluminum silicates including calcined and hydrous kaolin, diatomaceous earth, silica and mica. For scrub, burnish, and stain resistance, extenders like nepheline syenite, albite, and ceramic microspheres find use.

Calcined kaolin in paint has traditionally found use in interior higher PVC flat and eggshell paints. Its functionality has been as an opacifier to extend more costly pigments and provide flatting to control the gloss development of the coating. These pigment extenders are produced by partially or fully calcining a fine particle size fraction of hydrous kaolin. Calcined kaolin clay opacifying pigment extenders, such as the products supplied under the trademarks Satintone™ 5 and Satintone™ 5HB by BASF Corporation are exemplary and have proven superior to other pigment extenders, e.g. calcium carbonate and hydrous kaolins.

On a commercial scale, kaolin calcination may be carried out in a rotary calciner with countercurrent flow of hot air or in a Nichols Herreshoff vertical furnace. In the laboratory, a muffle furnace is usually applied. Kaolin to be calcined is typically a finely dispersed powder with a Hegman grind of 4.5 or higher. This degree of dispersion is generally achieved by passing the dry kaolin powder through an appropriately designed pulverization process.

To one skilled in the art of kaolin calcination, kaolin, when heated, will undergo a series of crystalline form changes that offer significantly different physical and chemical property attributes. The first of these occurs in the 840 to 1200° F. (450°-650° C.) range. Here hydrous kaolin dehydroxylates with the formation of an amorphous essentially anhydrous material usually referred to as "metakaolin."

As incremental heat is applied to metakaolin, its lattice will reconfigure to a gamma-alumina (spinel) phase. This typically occurs as the feed material reaches a temperature range of 1650 to 1750° F. (900 to 955° C.). Above this temperature, the gamma alumina incrementally converts to mullite. At 2300° F. (1260° C.), the conversion to mullite is essentially complete. At higher temperature, the synthetic mineral matrix will again reconfigure into cristobalite. X-ray diffractometry (XRD) is a convenient way to assess the level of mullite present in the spinel lattice. Mullite index (M.I.) is a quantitative x-ray diffraction method used to quantify the amount of mullite in a material. The quantification is done by integrating the area of a peak, or peaks, and comparing the integrated peak intensity of the unknown sample to a calibration curve. The calibration curve is typically formed by running samples consisting of 10% increments of mullite from 0% to 100%. Thus, a mullite index of 35 indicates that the sample contains about 35% mullite. Since mass absorption or preferred orientation typically are not taken into account, the mullite index value cannot exactly be termed as percent, but can be used in a relative sense as a useful percent range of mullite in the sample. In general, after calcination, the inert matrix typically has from 40-60% $SiO_2$ and 60-40% $Al_2O_3$.

Calcined kaolin pigment extenders have been used for several decades in a number of industrial applications such as paper coating, paper filling, paints, plastics, etc. In these applications the kaolin pigment extenders impart to the finished products a number of desirable properties: $TiO_2$ extension/opacity, sheen/gloss control, electrical resistivity, strength (in plastics), friction (in paper). Paper coating and filling applications almost exclusively require fine fully calcined kaolin pigments such as the 93% brightness ANSILEX®-93 pigment manufactured by BASF Corporation. See, for example, U.S. Pat. No. 3,586,523, Fanselow et al, which describes the production of such pigments from ultrafine Tertiary "hard" ultrafine kaolins. The term "fully calcined" is of interest because it defines a rather narrow range of calcined kaolin matrix structures. Calcination has been progressed into the spinel phase and arrested when only a small degree of mullite (10% by weight or less) has been incorporated.

The temperature at which the aforementioned crystalline transitions occur can be lowered by the addition of a flux to the hydrous kaolin feed before calcination as disclosed in commonly assigned U.S. Pat. No. 6,136,086. Reference is made to U.S. Pat. No. 2,307,239, Rowland, which is a pioneer patent in the field of calcined kaolin pigments. This patent broadly discloses addition of various alkali and alkaline earth compounds to clay before calcination.

SUMMARY OF THE INVENTION

By extending the range of kaolin heat treatment, spinel/mullite lattices can be created that increase the hardness of the product lattice and impart incremental opacity benefits in paint and other coating compositions. By converting a large percentage of the calcined kaolin to mullite, the product Mohs hardness can be raised into the 6.0 to 6.5 range. This level of hardness is in line with natural minerals like nepheline syenite and synthetic ceramic microspheres which find broader application as extenders in both interior and exterior paint applications. This novel calcined kaolin also offers improved opacity potential.

A typical calcined kaolin used in paint applications has a Mullite Index (M.I.) in the 3.0 to 10.0 range which relates to a Mohs hardness of 4.0 to 5.0. Calcined kaolin particles having a M.I. of at least 25.0 can find advantageous use in paints and other coating applications as providing increased scrub and burnish resistance and are a better opacifier than typical hard paint extenders nepheline syenite or ceramic microspheres, for example.

DETAILED DESCRIPTION OF THE INVENTION

The present invention is directed to a new type of pigment extender that can be used in combination with one or more pigments and is based on kaolin. The unique properties of the pigment extender have been engineered by combining hydrous kaolin selection/beneficiation, addition of flux(es) and high temperature firing. Properties such as scrub resistance and burnish resistance can be beneficially impacted by achieving a product M.I. of 25.0 or more A harder, more durable spinel/mullite lattice can be engineered. Fluxing agents can be utilized to lower the calcination temperature needed to obtain these property advantages.

The pigment extender of this invention is a calcined kaolin clay. Typically, fully calcined kaolin pigment extenders are produced from fine hard middle Georgia Tertiary kaolin crudes, such as those mentioned in U.S. Pat. No. 3,586,523, which carry iron and titanium contamination of about 0.90-1.1% $Fe_2O_3$ and 1.0-1.8% $TiO_2$, respectively. It has long been the practice to remove these impurities to various extents by physical or physical-chemical means, such as froth flotation, selective flocculation, magnetic purification, bleaching and combinations thereof. In any case, the clays may optionally be beneficiated to enhance brightness. The clay will usually also be fractionated to attain a desired particle size distribution. In any case, the kaolin clay employed in preparing the pigment extenders of the invention will normally have been at least degritted and classified to a desired size range by conventional techniques and optionally may be beneficiated to enhance brightness.

In the present invention, calcination is carried out at a temperature and for a duration of time sufficient to convert hydrous kaolin to spinel and then a targeted percentage of the spinel to mullite. Calcination temperature and residence time are a function of the process configuration utilized. The upper temperature limit for the calcination step is mandated by the amount of mullite desired in the finished crystalline lattice. It is known that calcination of kaolins at temperatures of 1400° C. to 1600° C. converts substantially all the kaolin to mullite. In this temperature region, control of kaolin heat treatment is problematic and generation of unwanted cristobalite is likely. Accordingly, the calcination temperature and time for calcination is limited to achieve a product M.I. of 25.0 to 62.0, including 35.0 to 62.0. Also exemplified are calcination conditions to achieve a product M.I. of 40.0 to 54.0. It is noted that flux addition will affect both of these requirements as well.

The hydrous kaolin clay feed to the calciner is dried and pulverized so that a finely dispersed powder is presented for heat treatment. In the ensuing examples, the hydrous kaolin feed for calcination was anionically dispersed for beneficiation and spray dried. This is but one of numerous approaches available to one skilled in the art of kaolin calcination. Uniform product heating to the requisite temperature is key to minimizing the generation of coarse agglomerates that can mitigate the level of scrubs/burnish resistance of the pigment extender and impact the film forming characteristics of the coating composition. The calcined products are therefore pulverized to a finely dispersed powder after calcination. The acceptance criteria for this attrition step is 2.0% or less by weight of particles +325 mesh.

Fluxing agents are preferably added to the hydrous kaolin slurry prior to drying and calcination. The dosage of fluxing agent and the type of fluxing agent required are dependent on the hydrous kaolin feed morphology and its particle size distribution. The fluxing agent may be mixed with kaolin in the presence of water at various points during the beneficiation of hydrous kaolin. Thus, the fluxing agent may be added during or after formation of a kaolin slurry. If added during slurry formation, the fluxing agent can act as a dispersing agent to improve kaolin dispersion. While not essential, it is preferable to add the flux to an anionically dispersed hydrous kaolin slurry just prior to spray drying. Once dried, the calciner feed is pulverized and then calcined at temperatures between 1050 to 1300° C. The calcination temperature is dictated by the desired level of product M.I. and process residence time. The calcined product is pulverized before use in formulating paints, paper coating colors, plastics, rubber and other applications.

A wide range of fluxing agents can be employed in preparing pigment extenders utilizing the present invention. These include alkali and alkaline metal ion salts of metal oxides, carbonates or their combinations. Typical metal oxides are boron oxides, silicates, alkali and alkaline earth oxides, germanates, phosphates, alumina, antimony oxide, lead oxide, zinc oxide, arsenic oxide and zirconate. Also included is boric acid. Typical carbonates are alkali and alkaline earth carbonates such as sodium carbonate, sodium bicarbonate, calcium carbonate and magnesium carbonate. This list is by no means exhaustive. Also included are organic and inorganic non-oxide salts of alkali or alkaline earth metals capable of forming metal oxides on exposure to air at calcination temperatures including halides, nitrates, acetates, hydroxides, sulfates and organic polyelectrolytes such as a sodium salt of poly[acrylic acid]. Preferred fluxing agents are alkali and alkaline earths of boron oxides, silicates, phosphates, alkali and alkaline earth metal salts of carbonates and bicarbonates, or their combinations. Especially preferred are borax [sodium borate, $Na_2O.2B_2O_3$ either in hydrated or anhydrous form], soda ash [$Na_2CO_3$], and sodium silicates with a weight ratio of $SiO_2$ to $Na_2O$ of 2.00 to 3.25. The sodium silicates are especially preferred for their ready availability, ease of mixing with hydrous kaolin in slurry form, low dosage level requirement and low cost. The calcined kaolin product will typically contain a small amount of active flux cations in an amount of 0.01 to less than 2.0% by weight.

In general, the calcined kaolin product will have a median particle size diameter of 1.0 to 10.0 microns as measured by a Sedigraph® 5120 particle size analyzer, manufactured by Micromeritics, Atlanta, Ga. A particle size diameter of 2 to 7 microns as measured by the Sedigraph® 5120 is also exemplified. The product weight fraction greater than 44 microns (+325) is preferably on the order of 0.01 to 1.0 percent by weight. Also, it is preferred that the particle size fraction less than 2 microns be in the range of 25-50%.

The pigment extender of the present invention can be effectively used in a paint. Such paints can include, but are not limited to, water-borne paints, solvent-borne paints, etc. In one non-limiting example, the pigment extender is included in a water-borne paint. In one non-limiting aspect of this example, the one or more polymers used in water-borne paints can include, but are not limited to, emulsion polymers of vinyl acetate, styrene, styrene-butadiene, vinyl acetate-vinyl chloride, acrylonitrile-butadiene, isoprene, vinylidene chloride-acrylonitrile, vinylidene chloride-vinyl acetate, vinyl chloride-acrylonitrile, acrylic acid ester and methacrylic acid ester polymers and copolymers thereof with other vinyl monomers, carboxylated synthetic and natural rubbers, and so forth. Other useful and well-known water-borne paints include the epoxies, alkyds, phthalic alkyds, emulsified drying oils, polystyrene, and the like. In one specific non-limiting example, the water-borne paint is a latex paint. One non-limiting example of the latex paint can include acrylic latex; however, it can be appreciated that many other or additional types of latex paints can be used.

In another non-limiting aspect of the present invention, a pigment that can be used in combination with the pigment extender includes white hiding pigments, and/or colored organic and/or inorganic pigments. The pigment is commonly used in paints or coatings to provide better "hiding power" and/or coverage. Generally, the prime pigment has a refractive index of at least about 1.8, and typically at least about 2.0; however, it can be appreciated that the pigment can have other refractive index values. Non-limiting examples of white pigments can include, but are not limited to, rutile and/or anatase titanium dioxides, basic lead silicate, lithopone, titanate lithopone, titanium-barium pigment, titanium-calcium pigment, titanium-magnesium pigment, zinc sulfide, lead titanate, antimony oxide, zirconium oxide, barium sulfide, white lead, zinc oxide, leaded zinc oxide, and the like, and/or one or more combinations thereof. In one specific non-limiting example, the white pigment includes at least about 20% titanium dioxide. In another specific non-limiting example, the white pigment includes at least about 50% titanium dioxide. When titanium dioxide is included in the hiding pigment, the average particle size of the titanium dioxide is about 0.1-0.5 microns; however, it can be appreciated that larger or smaller particle sizes can be used. The relative proportions of the pigment and the pigment extender of this invention may be varied widely, but usually the pigment is present at a concentration that provides the desired paint covering power or hiding, and the extender pigment is present in an amount which provides the paint with the desired total pigment volume concentration. The weight ratio of pigment extender to pigment in the paint or coating is generally at least about 0.1, and typically about 0.1-4:1; however, other weight ratios can be used.

In another non-limiting aspect of the present invention, the paint or coating agent includes a thickener. Many covering agents such as paints include thickeners to modify the rheological properties of the paint to ensure good spreading, handling, and/or other or additional application characteristics. In one non-limiting embodiment, the covering agent in the form of a paint includes a thickener such as, but not limited to, carboxylated thickeners, urethane associative thickener, polyacrylic acid thickeners, cellulosic thickeners, etc.; however, other or additional thickeners can be used in the covering agent.

The paint may include one or more other ingredients such as coalescing solvents (e.g., 2-phenoxyethanol, diethylene glycol butyl ether, dibutyl phthalate, diethylene glycol, 2,2,4-trimethyl-1,1,3-pentanediol monoisobutyrate, etc.), flatting agents (e.g., silica, etc.), plasticizer, pH adjuster, tinting color, anti-freeze agent (e.g., ethylene glycol, etc.), surfactant, defoamer, dispersant, anti-foaming agents, water, solvent, odor agents, preservative and/or biocide.

The paint or coating can be prepared utilizing conventional techniques. In one non-limiting embodiment, the ingredients of the paint can be blended together under high shear to form a mixture commonly referred to as "the grind". The consistency of this mixture is comparable to that of mud so as to efficiently disperse the ingredients with a high shear stirrer. During the preparation of the grind, high shear energy is used to break apart agglomerated particles. The ingredients not included in the grind are commonly referred to as "the letdown." The letdown is usually much less viscous than the grind, and is usually used to dilute the grind to obtain a final paint or coating with the proper consistency. The final mixing of the grind with the letdown is typically carried out with low shear mixing; however, this is not required.

EXAMPLE 1

A formulation of a paint composition as shown in Table 1 was prepared in which nepheline syenite and calcined kaolin with a product M.I. of 53.0 were utilized as the pigment extenders.

TABLE 1

Premium Interior Flat Paint Formulation

| | PBW |
|---|---|
| $TiO_2$ | 310.0 |
| Water | 70.0 |
| Ethylene Glycol | 21.6 |
| Dispersing Agent | 18.0 |
| Buffer | 0.5 |
| Wetting Agent | 3.0 |
| Defoamer | 1.0 |
| Pigment Extender | 245.0 |
| Attagel ® 50 | 3.0 |
| Hegman Grind 3 to 4, then add | |
| Water | 85.4 |
| Thickening Agents | 26.8 |
| Acrylic Emulsion | 325.0 |
| Coalescent | 13.4 |
| Opaque Polymer | 41.3 |
| Biocide | 1.3 |
| Fungicide | 3.5 |
| Defoamer | 3.0 |
| Total | 1171.7 |

Results of testing for hiding, gloss and sheen and film properties of the paint are shown in Table 2.

TABLE 2

| Properties | nepheline syenite 2 microns | nepheline syenite 3.5 microns | nepheline syenite 11 microns | 53.0 M.I. calcined kaolin 2.8 microns |
|---|---|---|---|---|
| Viscosity, KU (Krebs Units) | 102 | 102 | 100 | 99 |
| Contrast Ratio 3 mils | 98.24 | 97.53 | 97.22 | 97.80 |
| Reflectance | 90.49 | 90.77 | 91.13 | 89.32 |
| Hunter L | 96.78 | 96.88 | 96.99 | 96.64 |
| Hunter a | −0.77 | −0.80 | −0.83 | −0.94 |

TABLE 2-continued

| Properties | nepheline syenite 2 microns | nepheline syenite 3.5 microns | nepheline syenite 11 microns | 53.0 M.I. calcined kaolin 2.8 microns |
|---|---|---|---|---|
| Hunter b | 1.53 | 1.51 | 1.47 | 2.16 |
| Gloss @ 20 deg | 1.30 | 1.30 | 1.40 | 1.30 |
| Gloss @ 60 deg | 3.00 | 3.40 | 3.90 | 2.40 |
| Sheen @ 85 deg | 11.40 | 6.90 | 2.00 | 1.50 |
| Tint Strength: vs commercial control | 99.28 | 97.98 | 93.90 | 98.92 |
| Viscosity ICI, Poise | 1.58 | 1.52 | 1.52 | 1.60 |
| Scrub Resistance 7 Day Cure (ASTM D2486-06) | | | | |
| Sample Average | 1216 | 1188 | 1513 | 1711 |
| Commercial Control Average | 1338 | 1278 | 1280 | 1412 |
| % change in scrubs | −8 | 7 | 18 | 21 |
| Burnish Resistance 4 day cure (ASTM D6736-08) | | | | |
| Unscrubbed gloss 20°, 60°, 85° | 1.3 2.9 11.9 | 1.3 3.2 7.3 | 1.4 3.6 1.9 | 1.3 2.3 1.4 |
| Scrubbed gloss 20°, 60°, 85° | 1.4 3.9 17.0 | 1.4 3.9 10.5 | 1.4 3.8 2.7 | 1.3 2.8 3.2 |
| Gloss Difference | 0.1 1.0 5.1 | 0.1 0.7 3.2 | 0 0.2 0.8 | 0 0.5 1.9 |

Contrast Ratio is a measure of hiding power or opacity. A value of 0.98 or higher means complete hiding. Tint strength is a measure of a white paint to reduce the strength of a color dispersion, such as a carbon black dispersion in this case. The control is assigned a value of 100 and others are compared against it. Commercial control is a high quality paint bought from a hardware store.

Scrub test is conducted by ASTM method D2486-06 and burnish resistance is measured by ASTM D6736-08. In the scrub test, a paint film that has been air-dried for 7 days is subjected to repeated brush strokes using an abrasive media. The number of cycles to remove the paint film is the number used as scrub resistance cycles. Burnish resistance uses a similar method but in this case gloss and sheen are measured before and after the test and change is reported as burnish resistance.

As seen from Table 2, the kaolin pigment extender of this invention yields a combination of properties including very low sheen, good hiding and tinting strength, excellent scrub resistance and excellent burnish resistance. This combination is difficult to achieve in a single product. The comparison of the calcined kaolin-containing paint to the paints containing various particle sizes of Nepheline syenite, shows the pigment extender of the present invention seems to yield the best properties of all the grades of Nepheline syenite into a single product. The product of this invention is able to achieve very low sheen and therefore is very suitable for flat paints. Due to its high product M.I., the calcined kaolin has a very high hardness contributing to high scrubs. The unique particle size distribution provides a combination of good hiding, tint strength and low sheen.

The invention claimed is:

1. A kaolin pigment extender having a median particle size of greater than 2 to 7 microns, and which comprises a fully calcined kaolin clay having a product mullite index of 25.0 to 62.0.

2. The kaolin pigment extender of claim 1, in which the fully calcined kaolin clay has a product mullite index of 35.0 to 62.0.

3. The kaolin pigment extender of claim 1, in which the fully calcined kaolin clay has a product mullite index of 40.0 to 54.0.

4. The kaolin pigment extender of claim 1, further containing alkali or alkaline earth cations from a fluxing agent.

5. The kaolin pigment extender of claim 4, containing 0.01 to less than 2.0% by weight of said cations.

6. A paint composition comprising the pigment extender of claim 1.

7. The paint composition of claim 6, further including a prime pigment other than said fully calcined kaolin clay.

8. The paint composition of claim 7, wherein said prime pigment is titanium dioxide.

9. The paint composition of claim 6, comprising a waterborne paint.

10. The paint composition of claim 9, wherein said waterborne paint includes an acrylic polymer or copolymer.

11. The paint composition of claim 9, including a mixture of said fully calcined kaolin clay and a prime pigment, other than said fully calcined kaolin clay.

12. The paint composition of claim 11, wherein said prime pigment is titanium dioxide.

13. The paint composition of claim 6, wherein said fully calcined kaolin clay has a product mullite index of 35.0 to 62.0.

14. The paint composition of claim 6, wherein said fully calcined kaolin clay has a product mullite index of 40.0 to 54.0.

15. A method of forming an improved kaolin pigment extender comprising:
    forming an aqueous slurry of hydrous kaolin, spray drying said slurry to a dried kaolin product,
    calcining said dried kaolin product at a temperature and a time sufficient to convert the hydrous kaolin to a fully calcined kaolin clay having a product mullite index of 25.0 to 62.0, and
    pulverizing said fully calcined kaolin clay to particles having a median particle size of greater than 2 to 7 microns.

16. The method of claim 15, wherein a fluxing agent is added to said hydrous kaolin during the formation of said slurry or after the formation of said slurry, prior to spray drying.

17. The method of claim 16, wherein said fluxing agent is selected from alkali and alkaline earth metal salts.

18. The method of claim 17, wherein said fluxing agent is selected from borax, soda ash, and sodium silicates.

19. The method of claim 18, wherein said fluxing agent is a sodium silicate having a weight ratio of $SiO_2$ to $Na_2O$ of 2.0 to 3.25.

20. The kaolin pigment extender of claim 1, wherein the particle size fraction less than 2 microns is from 25% to 50%.

\* \* \* \* \*